July 10, 1923.
S. HERMANOWICH
MEAT BLOCK CLEANER
Filed May 15, 1922
1,461,615
2 Sheets-Sheet 1
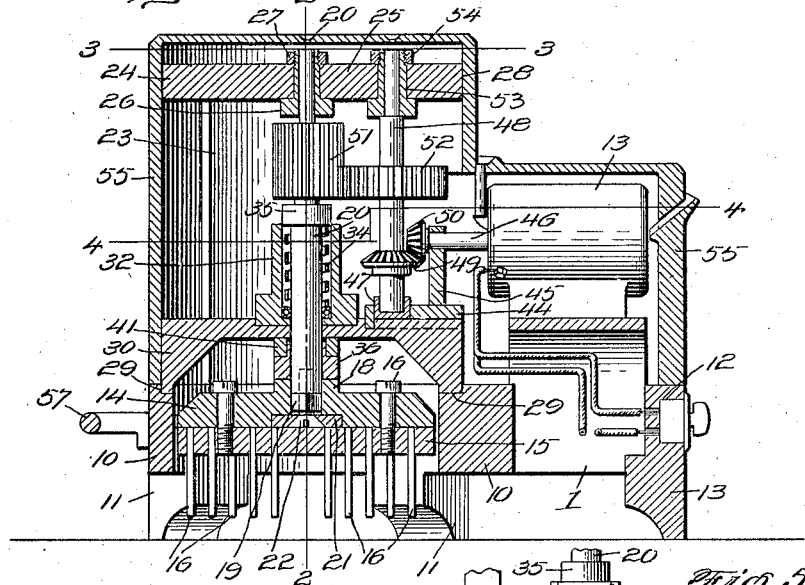
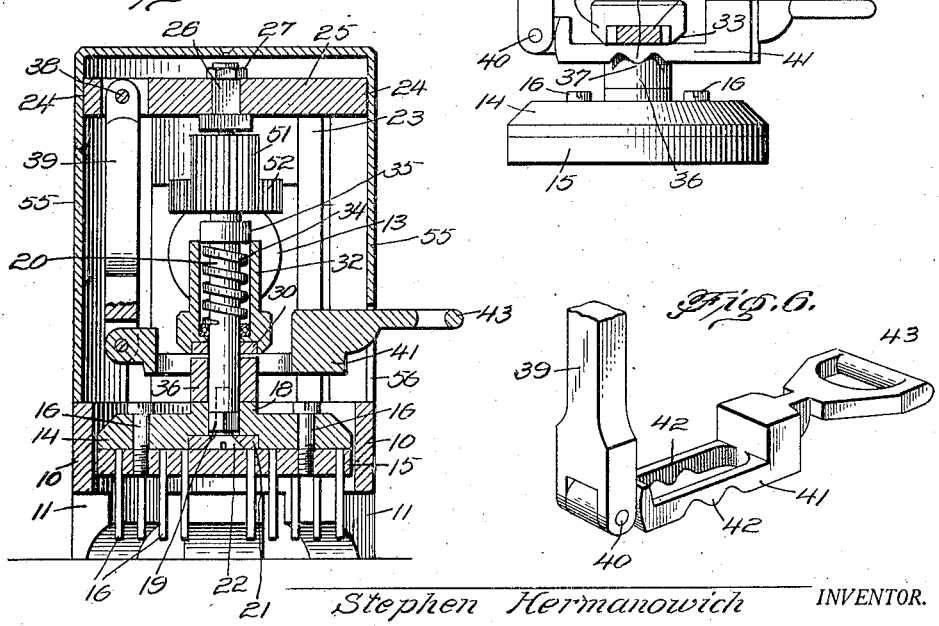
Stephen Hermanowich  INVENTOR.
BY Geo. P. Kimmel
ATTORNEY.

July 10, 1923.

S. HERMANOWICH

MEAT BLOCK CLEANER

Filed May 15, 1922

Stephen Hermanowich INVENTOR.

BY
Geo. P. Kimmel
ATTORNEY.

Patented July 10, 1923.

1,461,615

UNITED STATES PATENT OFFICE.

STEPHEN HERMANOWICH, OF ELLWOOD CITY, PENNSYLVANIA.

MEAT-BLOCK CLEANER.

Application filed May 15, 1922. Serial No. 561,005.

*To all whom it may concern:*

Be it known that I, STEPHEN HERMANOWICH, a citizen of Russia, residing at Ellwood City, in the county of Lawrence and State of Pennsylvania, have invented certain new and useful Improvements in Meat-Block Cleaners, of which the following is a specification.

This invention relates to devices for cleaning surfaces from accumulations of material such as meat blocks, the meat cutting boards of counters, and the like, and has for one of its objects to improve the construction and increase the efficiency and utility of devices of this character.

Another object of the invention is to provide a device of this character including a head member mounted for rotation on a supporting frame and provided with a plurality of scraper elements arranged in volute order so that as the head member is rotated, and the device moved over the surface to be cleaned, every portion of the surface will be acted on by the scraper elements and no unscraped portions remain.

Another object of the invention is to provide a device of this character which is self contained and adapted to be moved by one hand over the surface to be treated and the degree of pressure imparted to the scraper elements controlled by the other hand.

With these and other objects in view the invention consists in certain novel features of construction as hereinafter shown and described and then specifically pointed out in the claims, and in the drawings illustrative of the preferred embodiment of the invention:—

Figure 1 is a vertical side elevation.

Fig. 2 is a vertical section on the line 2—2 of Fig. 1.

Fig. 5 is a detail view of the scraper carrying head and its adjusting lever devices.

Fig. 6 is a detached perspective view of the lever device for adjusting the scraper carrying head.

Figure 3:
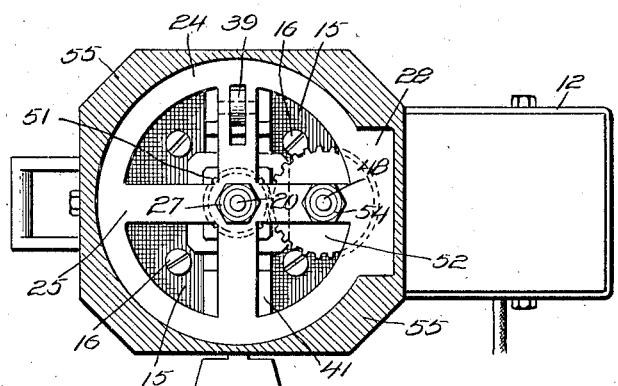
Fig. 3 is a transverse section on the line 3—3 of Fig. 1.
Figure 4:
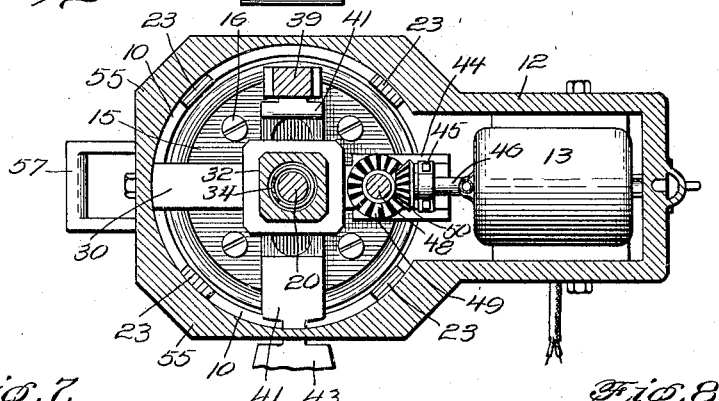
Fig. 4 is a transverse section on the line 4—4 of Fig. 1.

The improved device is smaller than the surface to be treated and is designed to be moved over the surface to cause the scraper elements to reach every part, and comprises a hollow base member or frame indicated as a whole at 10 and provided with supporting feet 11 and a lateral extension 12 for supporting a small motor, preferably electrically operated, and indicated conventionally at 13.

Movable vertically within the hollow of the base 10 is a head member 14 having a disk 15 attached thereto by screws 16. The disk 15 is formed with a plurality of seats or sockets each designed to receive a scraper blade 17 with the lower end of each blade chisel shaped as shown at 17' in Fig. 9, which represents a part of one of the blades detached.

Figure 8:
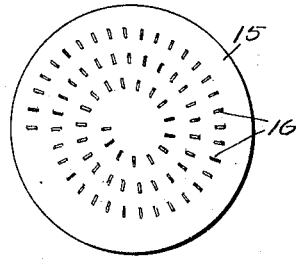
Fig. 8 is a bottom plan view of the scraper carrying head.

The sockets for the blades are preferably arranged in volute order as indicated in Fig. 8, the object to be hereafter explained.

The head member 14, is provided with an upwardly directed hub 18, and furthermore provided with a polygonal shaped opening, which registers with the hub 18. The polygonal shaped opening in the head member 14, receives the polygonal shaped lower end 19, of the shaft 20, thereby providing for the bodily rotation of the head member 14, and shaft 20, and also preventing the rotation of the head member 14, independently of the shaft 20.

The lower face of the head member 14, is provided with a recess, with which communicates the polygonal shaped opening in the head member and mounted in said recess is a washer 21, the aperture of the washer being bevelled to receive the tapered head of a screw 22 which is tapped into the lower polygonal shaped end of the shaft 20. By this means the head member 14 and its attached scraper carrying member 15 are firmly coupled to the shaft and move therewith, both rotatively and longitudinally.

Formed in the upper side of the hollow base member 10 and opening into the interior thereof are a plurality of sockets uniformly spaced and each supporting a standard 23. The standards 23, at their upper ends are connected to a spider element, which consists of an annular portion 24 and a series of radially disposed arms 25, which are formed integral with each other at the intersection thereof. Mounted in the spider at the intersection of the arms 25, is a flanged bushing 26, in which the upper end of the shaft 20 is journaled. The upper end of the bushing 26, is threaded and engaging therewith is a clamp nut 27 for the purpose of securing the bushing 26 to the spider.

The "spider" member is formed with a lateral projection 28 at the side next to the motor 13, the object to be hereafter explained.

Figures 7, 9:
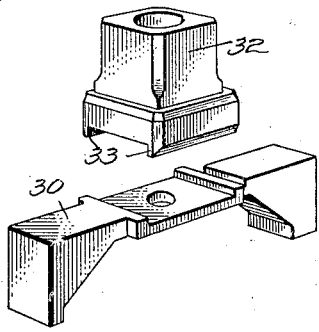
Fig. 7 represents the bridging member detached and in perspective.
Fig. 9 is an enlarged detached perspective view of one of the scraper elements.

Supported in the sockets 29 in the upper side of the base member 14 is a bridging member 30 having an intermediate seat 31 as shown in Fig. 7, to support a block device 32, the latter having guide ribs 33 to bear upon opposite sides of the bridge member 30. The members 30 and 32 are bored to receive the shaft 20, as shown, and the block 32 is counterbored to receive a spring 34, while the shaft 20 is provided with a stop collar 35 against which the spring bears at its upper end. By this means the shaft 20 together with its attached scraper carrying head, are yieldably maintained in their upper position with the scraper elements in inoperative position.

Bearing upon the hub member 18 of the head member 14 and through which the shaft 20 extends, is a sleeve 36 having diametrically opposite seats 37 in the upper face. Pivoted at 38 in one of the arms 25 of the spider member is a link 39, and pivoted at 40 at the lower end is a shipper lever 41, the latter divided to bear upon opposite sides of the shaft 20 and the division portions provided respectively with projections 42 to engage in the seats 37 of the sleeve, as shown more particularly in Fig. 5.

The lever member 41 is extended at its free end and terminates in a hand grip 43 to enable the lever 41 to be depressed to move the head member downwardly against the resistance of the spring 34, and thus compress the scraper elements into engagement with the structure to be treated.

Mounted upon the bridging member 30 is a support 44 carrying a standard 45 to support the drive shaft 46 of the motor 13. Stepped at 47 on the support 44 is a vertical counter shaft 48 carrying a bevel gear 49 with which a bevel pinion 50 on the motor shaft engages. By this means the motion of the motor shaft is communicated to the vertical shaft 48. Mounted on the main shaft 20 is a relatively small gear 51 having relatively long teeth longitudinally of the shaft, and in constant engagement with a larger gear 52 on the vertical counter shaft 48.

By forming the teeth of the gear 51 relatively long it will retain its connection with the gear 52 regardless of the longitudinal adjustment of the shaft 20, as will be obvious.

At its upper end the shaft 48 is supported in a bushing 53 in one of the arms 25 of the spider member, and secured from vertical displacement by a clamp nut 54.

The frame member 10 and its motor carrying extensions 13 are enclosed in a cover or shield represented as a whole at 55.

The operating hand grip portion 43 of the scraper controlling lever 41 extends through an opening 56 in the hood or closure 55, so that the lever can be operated externally of the hood.

The base or frame member 14 is also provided with a hand grip 57 to enable the device to be moved over the surface being treated by the scraper elements, and the friction of the latter can be easily controlled by the pressure applied to the lever 41, as will be obvious.

The operation of the device is as follows:—

The circuit being closed to start the motor. the gear connections 49, 50, will operate the shaft 48, and through the medium of the gear connections 51, 52, the shaft 20 will be operated, carrying the head member 14 therewith. Prior to the closing of the circuit to operate the motor 13, the head member 14 is lowered by the actuation of the lever 41, whereby the scraping blade 17, will be positioned against the surface to be cleaned and on the operation of the shaft 20, in a manner as heretofore stated, the head member 14, will be revolved and the action of the scraping blades 17, will clean the surface. The apparatus is shifted manually over the different portions of the surface which are to be cleaned.

Having thus described the invention what is claimed as new is:—

1. A meat block cleaner comprising a head member formed with a polygonal shaped opening and a recess communicating with the opening, a washer mounted in said recess, a driven shaft having a polygonal shaped lower end engaging in the polygonal shaped opening of the head member to provide for the bodily rotation of the latter, a securing element extending up through said washer and engaging in the polygonal shaped end of said shaft, and a disk secured to the lower face of said member and inclosing said washer.

2. A meat block cleaner comprising a head member having its lower face provided with an opening, said head member further having a centrally disposed opening with the lower portion thereof of polygonal contour, said opening of less diameter than and communicating with said recess, an apertured element seated in said recess, a shaft extended into said opening and having a polygonal shaped lower end positioned in the polygonal shaped lower portion of said opening whereby the head will be revolved with the shaft during the operation thereof, means seated in said recess and engaging in the shaft for connecting the latter to the head, and means secured to the head for inclosing said element.

3. A meat block cleaner comprising a hollow base provided with spaced sockets, a housing mounted on the base, a bridge member extended into said sockets and inclosed by said housing, said member having an opening and a seat, a block element mounted on said seat and having ribs bearing against the opposite sides of said member, said element being counter-bored, a shaft extending down through said element and member and provided with a collar, a coiled spring arranged within said element surrounding said shaft and bearing against the collar, and means for shifting said shaft against the action of said spring.

In testimony whereof, I affix my signature hereto.

STEPHEN HERMANOWICH.